(12) United States Patent
Kral

(10) Patent No.: US 9,237,802 B1
(45) Date of Patent: Jan. 19, 2016

(54) MULTIFUNCTIONAL PORTABLE WORKSTATION

(71) Applicant: Nathan R. Kral, Flower Mound, TX (US)

(72) Inventor: Nathan R. Kral, Flower Mound, TX (US)

(*) Notice: Subject to any disclaimer, the term of this patent is extended or adjusted under 35 U.S.C. 154(b) by 0 days.

(21) Appl. No.: 14/671,934

(22) Filed: Mar. 27, 2015

(51) Int. Cl.
| | |
|---|---|
| *A47B 97/04* | (2006.01) |
| *A47B 23/04* | (2006.01) |
| *F16B 12/10* | (2006.01) |
| *A47B 13/00* | (2006.01) |
| *G06F 1/16* | (2006.01) |

(52) U.S. Cl.
CPC ............... *A47B 23/04* (2013.01); *A47B 13/003* (2013.01); *F16B 12/10* (2013.01); *G06F 1/1632* (2013.01); *A47B 2023/049* (2013.01); *F16B 2012/103* (2013.01); *F16B 2012/106* (2013.01)

(58) Field of Classification Search
CPC ................. A47B 23/04; A47B 13/003; A47B 2023/049; A47B 2200/0091; A47B 3/06; A47B 2003/0824; A47B 2220/0019; A47B 3/10; A47B 3/12
USPC .............. 248/460, 461, 188.7, 529, 150, 165, 248/469, 472
See application file for complete search history.

(56) References Cited

U.S. PATENT DOCUMENTS

| | | | | |
|---|---|---|---|---|
| 4,105,176 | A * | 8/1978 | Hill | F16M 11/00 248/165 |
| 5,615,620 | A * | 4/1997 | Owen | A47B 23/04 108/150 |
| 5,797,578 | A * | 8/1998 | Graffeo | A47B 23/043 248/453 |
| 6,076,787 | A * | 6/2000 | Troyer | A47B 23/04 248/166 |
| 8,746,156 | B2 | 6/2014 | Camarillo | |
| 2006/0022097 | A1* | 2/2006 | Homer | G06F 1/1601 248/146 |
| 2012/0293931 | A1* | 11/2012 | Liu | A47B 23/043 361/679.02 |
| 2014/0175235 | A1* | 6/2014 | Bunch | F16M 11/16 248/157 |
| 2015/0208634 | A1* | 7/2015 | Box | A01K 97/10 108/25 |

* cited by examiner

*Primary Examiner* — Christopher Garft

(57) ABSTRACT

A portable, monopod workstation including a planar surface and an unstable support rod. The planar surface configured to support a tablet or notepad and detachably couple to an unstable support rod. The unstable support rod comprising one or more first type mounting joints and one or more second type mounting joints and configured elevate the planar surface, and further comprises a first member and a second member. The first member and second member are configured to detachably couple to different mounting locations on the planar surface, orient the planar surface when coupled to the back side of the planar surface, and restrain articles from sliding off the planar surface.

20 Claims, 4 Drawing Sheets

MULTIFUNCTIONAL PORTABLE WORKSTATION

TECHNICAL FIELD

The present application relates generally to personal workstations, and more specifically to an elevated, portable, baseless, monopod workstation.

BACKGROUND

Using a notepad, cell phone, tablet or similar object can become cumbersome when writing in a seated or reclining position or reading while using both hands for something else. Using a hard surface on a person's lap does not allow for using a notepad, cell phone or tablet at an ideal position.

SUMMARY

For a more complete understanding of the present disclosure and its advantages, reference is now made to the following description taken in conjunction with the accompanying drawings, in which like reference numerals represent like parts:

In certain embodiments, a portable, baseless, monopod workstation is provided. The workstation includes a planar surface and an unstable support rod. The planar surface is configured to support a tablet or notepad and detachably couple to an unstable support rod. The unstable support rod comprising one or more first type mounting joints and one or more second type mounting joints and configured elevate the planar surface, and further comprises a first member and a second member. The first member and second member are configured to detachably couple to different mounting locations on the planar surface, orient the planar surface when coupled to the back side of the planar surface, and restrain articles from sliding off the planar surface.

In certain embodiments, a portable, baseless, monopod, tablet support apparatus is provided. The tablet support apparatus includes a planar surface, a battery and an unstable support rod. The planar surface is configured to support a tablet or notepad and detachably couple to an unstable support rod. The unstable support rod comprising one or more first type mounting joints and one or more second type mounting joints and configured elevate the planar surface, and further comprises a first member and a second member. The first member and second member are configured to detachably couple to different mounting locations on the planar surface, orient the planar surface when coupled to the back side of the planar surface, and restrain articles from sliding off the planar surface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 3, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

Current portable desks, or workstations, are not designed to provide a work surface at different angles for tablets computers. Current tablet computer stands are designed for specific tablets and not intended for use with all sizes and models of tables, for supporting books and documents, or for serving as a writing surface. Current book stands also are not suited to rest on a person in a seated or lying position and not intended as a writing surface that a person could use sitting in a chair or on a bench.

Certain embodiments of the present disclosure provide a portable and versatile surface that is suited for a variety of functions and uses. The workstation provides a writing surface for documents or provides a support stand for portable computing devices, such as tablet computers, and other objects.

The workstation provides an elevated portable desk or writing surface for a user in a sitting or reclining position. According to certain embodiments, an unstable support rod detachably couples to one or more different mounting joints that are disposed on multiple faces of the workstation. According to certain embodiments, the unstable support rod elevates the planar surface. According to certain embodiments, the planar surface is stabilized by one of the user's hands or by resting on or against the body of the user. The unstable support rod receives extra stability when positioned between the user's legs.

According to certain embodiments, the workstation provides an oriented viewing stand when placed on a flat surface. The orientation is altered by coupling a support rod at different mounting locations on a back surface, namely a back face, of the workstation. The support rod includes a first member and a second member. In certain embodiments, the support rod can be separated into a first support rod and a second rod to provide different angular orientations for the planar surface of the workstation. In certain embodiments, one of the members of the support rod couples to the front surface to provide a ledge to keep the items supported from falling off the planar surface.

Figure 1A:
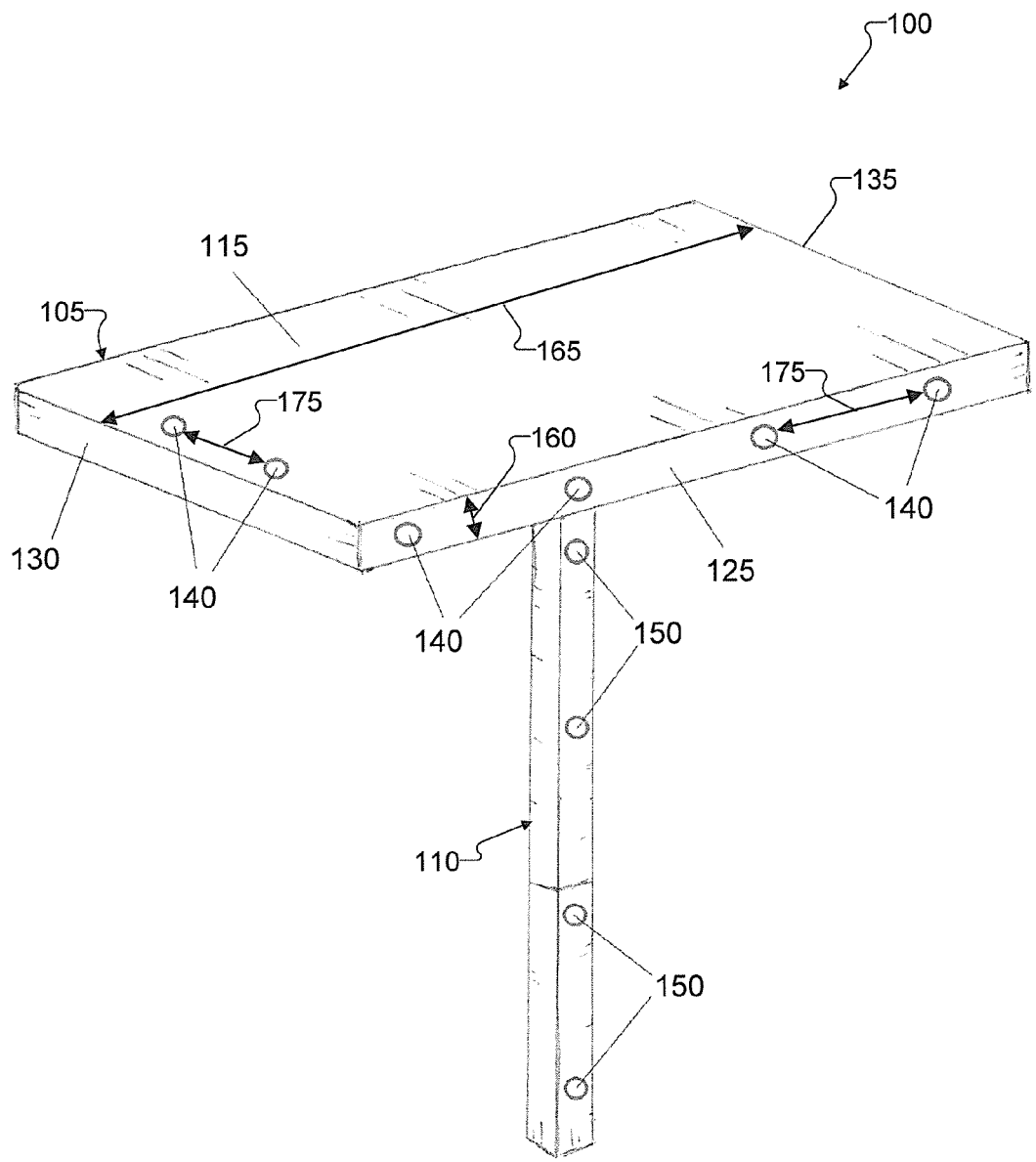
FIGS. 1A and 1B illustrate elevated configurations for a portable workstation according to embodiments of the present disclosure.
Figure 1B:
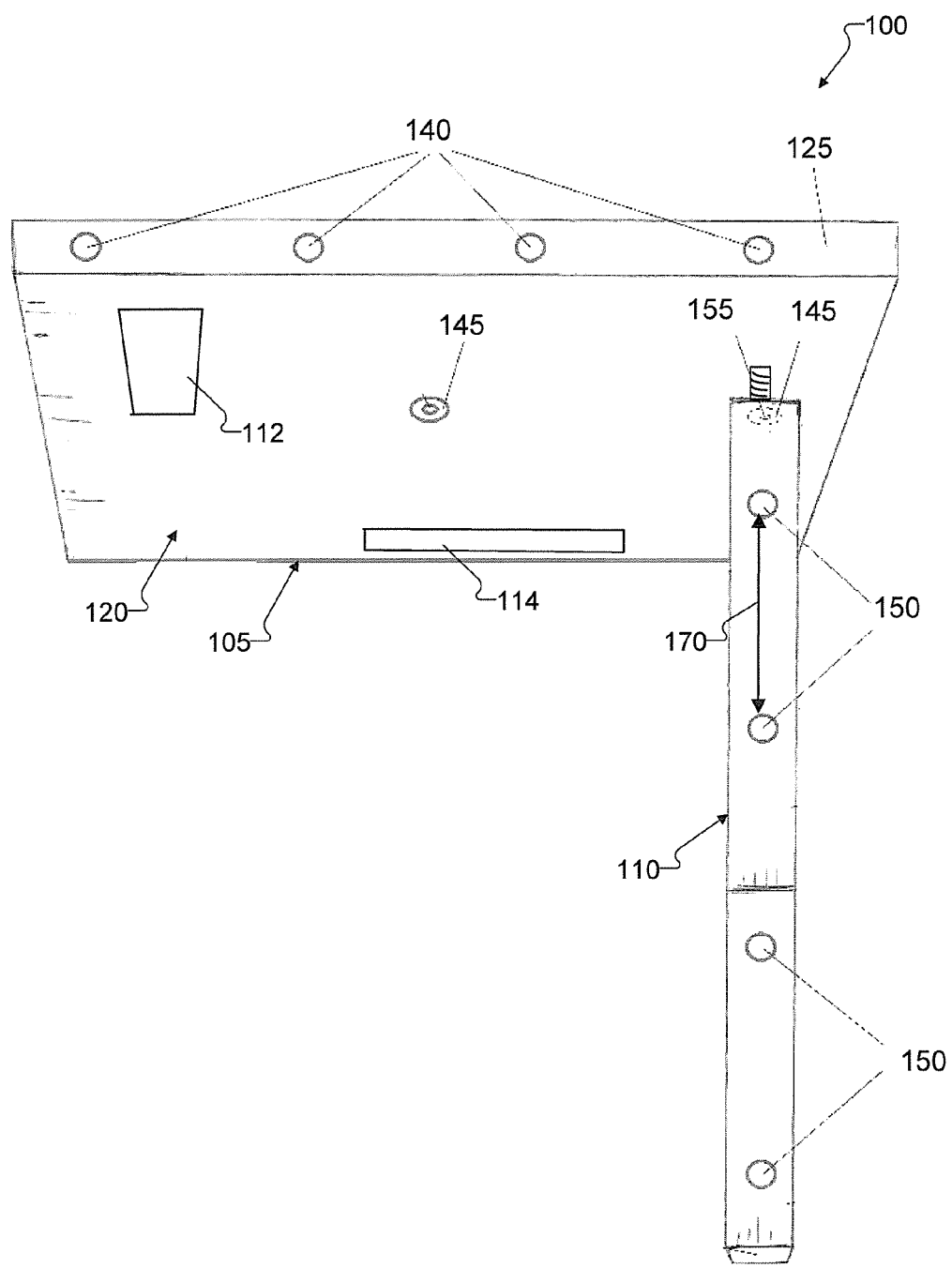

FIGS. 1A and 1B illustrate elevated configurations for a portable workstation 100 according to embodiments of the present disclosure. The embodiment of the portable workstation 100 is for illustration only. Other embodiments could be used without departing form the scope of the present disclosure.

In the example shown in FIG. 1A, the workstation 100 is a compact, portable, monopod, baseless workstation 100. The workstation 100 includes a planar surface 105 and a support rod 110. In certain embodiments, the planar surface 105 and the support rod 110 are made from similar materials. In certain embodiments, the planar surface 105 and the support rod 110 are made from different materials. In certain embodiments, the planar surface 105 and unstable support rod 110 are made of wood. However, the planar surface 105 and support rod 110 can be made of any suitable material.

The support rod 110 provides an unstable support means for the planar surface 105. That is, in certain embodiments, the support rod 110 is configured to elevate the planar surface 105 but is not able to maintain a specified position unless additional support is provided. For example, in order to maintain a stable orientation of the planar surface 105, a user may have to physically hold the support rod 110 or affix the support rod 110 to another object.

In certain embodiments, the workstation 100 includes a power supply 112, such as a battery. In certain embodiments, the battery is charged through a charge port located on the planar surface 105, which also can be used to charge a tablet, cellphone, or other electronic device. In certain embodiments, the power supply 112 includes a solar cell configured to charge the power supply 112 or otherwise provide electrical energy to the electronic device. In certain embodiments, the power supply 112 can also charge the tablet, cellphone, or other device through other methods such as through inductive charging.

In certain embodiments, the workstation 100 includes an embedded stylus 114. The embedded stylus 114 is located inside the planar surface 105, but can also be attached to a side face 125.

The workstation 100 provides a portable support surface adapted to fit in a user's hand. The planar surface 105 includes a front face 115, a back face 120, two side faces 125, a bottom face 130, and a top face 135, and a plurality of first connection joints 140 and a plurality of second connection joints 145. The planar surface 105 is dimensioned to be approximately the size of a notepad. For example, the planar surface 105 can be dimensioned to be similar in size to a half sheet of paper such as by being dimensioned to have a length of 8.5 inches and a width of 5.75 inches. Although dimensioned for a notepad, the planar surface 105 also accommodates different size electronic devices.

The planar surface 105 includes one or more second connection joints 145 disposed on a number of different surfaces to detachably couple to a support rod 110 and to support an electronic device or notepad. The front face 115 includes one or more first connection joints 140 located at one or more lateral edges, such as the bottom edge of the front face 115. The first connection joints 140 are adapted to couple with one or more corresponding third connection joints 150 on the support rod 110 or the different members of the support rod 110 to provide a ledge to support the electronic device or notepad when the planar surface 105 is disposed at an angle.

The connection joints 140 and 150 can comprise any means for detachably affixing two elements together such as by adhering, attaching, bolting, coupling, fastening, fixing, holding, linking, locking, mounting, securing, and suspending. The first connection joints 140 can include one or more of: magnets, VELCRO®, snaps, screws, a latch, lock, pin, interlock, dowel or any other method of detachably coupling. The third connection joints 150 can include one or more of: magnets, VELCRO®, snaps, screws or any other method of detachably coupling. In certain embodiments the first connection joints 140 and third connection joints 150 are magnets, such as neodymium magnets. In certain embodiments, the first connection joints 140 and third connection joints 150 are configured to be flush with a surface of the side on which they are mounted.

The back face 120 is configured to detachably couple to the support rod 110 at multiple mounting locations to provide different elevations and orientations of the planar surface 105. The back face 120 includes one or more second connection joints 145 adapted to couple to one or more corresponding fourth connection joints 155 on the support rod 110. The second connection joints 145 can be the same as or different from the first connection joints 140. In certain embodiments, the second connection joints 145 are threaded holes positioned at one or more mounting locations on the back face 120, such as approximately at the center of the back face 120 and at the middle of the end closest to the front face 115. The connection joints 145 and 155 can comprise any means for detachably affixing two elements together such as by adhering, attaching, bolting, coupling, fastening, fixing, holding, linking, locking, mounting, securing, and suspending. In certain embodiments, one of the connection joints 145 and 155 includes a male end means for coupling two elements while the other of the connection joints 145 and 155 comprises a female end means for coupling the two elements.

One or more of the side faces 125 include one or more first connection joints 140 to couple to the support rod 110 at multiple mounting locations. The first connection joints 140 can be similar or different to the connection joints on the front face 115, the back face 120, or both. In certain embodiments, the first connection joints 140 are the same on the front face 115 and the side face 125 to provide alternate configurations when detachably coupling to the support rod 110.

The support rod 110 is dimensioned to have a certain thickness equal to or less than a thickness of the planar surface 105. For example, the support rode 110 can be dimensioned to have a thickness equal to a width 160 of a side face 125. The support rod 110 is dimensioned to have a length equal to a length 165 of the front face 115 of the planar surface 105. The support rod 110 is sturdy to provide a rigid support, while remaining unconnected to any base structure such that the support rod 110 also remains unstable. The support rod 110 is dimensioned to fit comfortably between the legs of a user to obtain additional support from the user's positioning. In certain embodiments the support rod 110 orients the planar surface 105 when placed on a flat surface. The back face 120 also can be rested on another flat surface to provide extra support.

The support rod 110 can couple to different mounting locations disposed on each of a number of faces of the planar surface 105. The support rod 110 includes third connection joints 150 and fourth connection joints 155. Third connection joints 150 and fourth connection joints 155 are able to connect to various mounting locations via corresponding first connection joints 140 and second connection joints 145 on the planar surface 105. That is, the third connection joints 150 are adapted to couple to the first connection joints 140 and the fourth connection joints 155 are adapted to couple to the second connection joints 145, but the method of connecting between the respective connection joints can be the same or different.

When the support rod 110 is coupled to the back face 120 of the planar surface 105, such as by using the fourth connection joint 155, the support rod 110 elevates or orients, or both, the planar surface 105. The support rod 110 connects at different mounting locations on the back face 120 of the planar surface 105. In certain embodiments, the mounting locations are fixed at one or more second connection joints 145 on the back face 120. In certain embodiments, the support rod 110 is connected to not tilt or swivel. In certain embodiments, the support rod 110 is rigid and does not extend by sliding or locking.

In certain embodiments, a spacing 170 of the third connection joints 150 is the same as a spacing 175 of the first connection joints 140 to enable easy alignment and positioning of the support rod 110 along the side face 125 and the front face 115. When the support rod 110 is coupled to the first connection joints 140 using the third connection joints 150, the support rod 110 either provides a ledge for restraining the electronic device or notepad from sliding off the planar surface 105 or is compactly secured on the side face 125 for storage or transportation. When the support rod 110 is detachably coupled to the side face 125 of the planar surface 105, the support rod 110 is further dimensioned to have a profile that remains within a profile of the side face 125 of the planar surface 105. Although the support rod 110 is used to provide a ledge, the planar surface does not require the support rod 110 or any other part or connection to support the electronic device or notepad.

Figure 2:
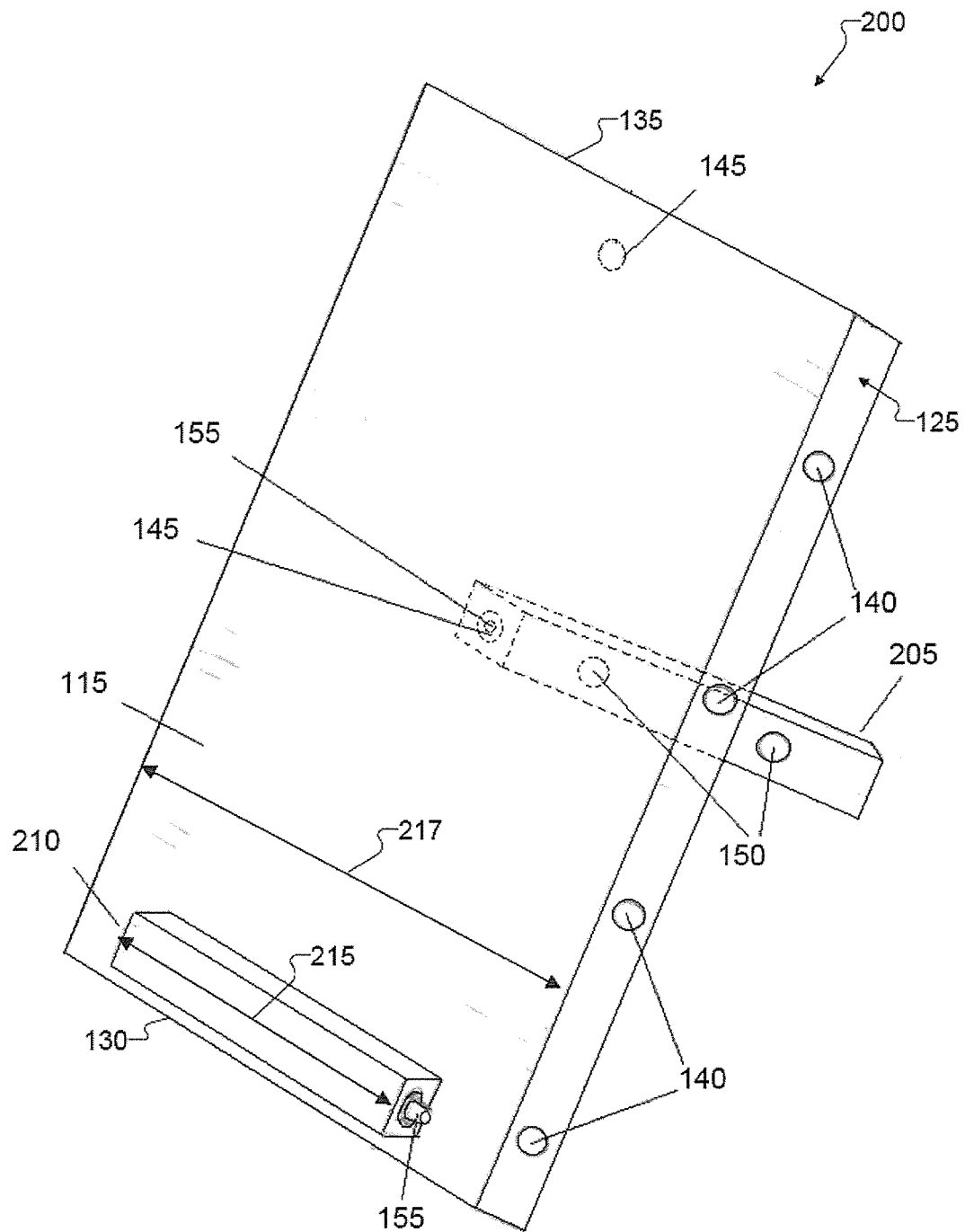
FIG. 2 illustrates an oriented configuration for a portable workstation according to embodiments of the present disclosure.

FIG. 2 illustrates an oriented configuration for a portable workstation 200 according to embodiments of the present disclosure. The embodiment of the portable workstation 200 is for illustration only. Other embodiments could be used without departing from the scope of the present disclosure.

The support rod 110 separates into a first member 205 and a second member 210. In the example shown in FIG. 2, the first member 205 and second member 210 are different lengths. However, embodiments in which the support rod 110 includes more than two members or in which the members include similar lengths could be used without departing from the scope of the present disclosure. In certain embodiments, one or both of the lengths 215 of the first member 205 and the second member 210 are shorter than a width 217 of the front face 115 of the planar surface 105. In certain embodiments, a total length of both the first member 205 and the second member 210, such as when coupled together, is less than the length of the front face 115 of the planar surface 105. The first member 205 and second member 210 each include a second connection joint 145 and fourth connection joint 155 at opposite longitudinal ends of the respective member. For example, the fourth connection joint 155 can be a male connector and the second connection joint 145 can be a female connector. Additionally, the first member 205 can include the male connector at one longitudinal end and the female connector at the other longitudinal end and the second member 210 can include the male connector at one longitudinal end and the female connector at the other longitudinal end. The first member 205 is able to couple to the second member 210 by engaging the male fourth connection joint 155 on the first member 205 with the female second connection joint 145 on the second member 210, which secures the first member 205 to the second member 210. In certain embodiments, using a same type of the second connection joints 145 as the female connection on one end of the first member 205 or the second member 210 increases the amount of possible configurations of the workstation 200. In certain embodiments, when the first member 205 and the second member 210 are different lengths 215, a vast variety of orientations and elevations of the planar surface 105 are possible.

The first member 205 includes third connection joints 150 and fourth connection joint 155. The third connection joints 150 and fourth connection joint 155 enable the support rod 110 to connect to different parts of the planar surface 105, although the method of connecting can be the same. The first member 205 is adapted to couple to different mounting locations on each of a number of faces of the planar surface 105. The third connection joints 150 are adapted to couple the first member 205 to the front face 115 of the planar surface 105 or couple the first member 205 to the side face 125 of the planar surface 105. When the first member 205 is coupled to the front face 115 of the planar surface 105, such as by connecting the third connection joints 150 to the first connection joints 140, the profile of the first member 205 remains within a profile of the front face 115 of the planar surface 105. When the first member 205 is coupled to the side face 125 of the planar surface 105, such as by connecting the third connection joints 150 to the first connection joints 140, the profile of the first member 205 remains within a profile of the side face 125 of the planar surface 105. When the first member 205 is coupled to the front face 115, such as by connecting the third connection joints 150 to the first connection joints 140, the first member 205 is positioned and affixed to provide a ledge for holding the electronic device or notepad or from restraining the electronic device or notepad from sliding off the planar surface 105. When the first member 205 is coupled to one of the side faces 125, such as by connecting the third connection joints 150 to the first connection joints 140, the first member 205 is compactly secured on the side face 125 for storage or transportation.

When the first member 205 is detachably coupled to the back face 120 of the planar surface 105, such as by connecting the fourth connection joints 155 to the second connection joint 145, the first member 205 elevates or orients the planar surface 105. The first member 205 is able to connect at different mounting locations on the back face 120 of the planar surface 105. In certain embodiments, the mounting locations are fixed at the second connection joints 145 on the back face 120.

The second member 210 includes third connection joints 150 along a lateral surface and a respective second connection joint 145 and fourth connection joint 155 disposed at opposite end surfaces of the second member 210. The third connection joints 150 and fourth connection joint 155 enable the support rod 110 to connect to different parts of the planar surface 105, although the method of connecting can be the same. The second member 210 is adapted to couple to different mounting locations on each of a number of faces of the planar surface 105. The third connection joints 150 are adapted to couple the second member 210 to the front face 115 of the planar surface 105 or couple the second member 210 to the side face 125 of the planar surface 105. When the second member 210 is coupled to the front face 115 of the planar surface 105, such as by connecting the third connection joints 150 to the first connection joints 140, the profile of the second member 210 remains within a profile of the front face 115 of the planar surface 105. When the second member 210 is coupled to the side face 125 of the planar surface 105, such as by connecting the third connection joints 150 to the first connection joints 140, the profile of the second member 210 remains within a profile of the side face 125 of the planar surface 105. When the second member 210 is coupled to the front face 115, such as by connecting the third connection joints 150 to the first connection joints 140, the second member 210 is positioned and affixed to provide a ledge to hold the electronic device or notepad or restrain the electronic device or notepad from sliding off the planar surface 105. When the second member 210 is coupled to one of the side faces 125, such as by connecting the third connection joints 150 to the first connection joints 140, the second member 210 or is compactly secured on the side face 125 for storage or transportation.

When the second member 210 is coupled to the back face 120 of the planar surface 105, such as by connecting the fourth connection joints 155 to the second connection joint 145, the second member 210 elevates or orients the planar surface 105. The second member 210 is able to connect to the planar surface 105 at different mounting locations on the back face 120 of the planar surface 105. In certain embodiments, the mounting locations are fixed at the second connection joints 145 on the back face 120.

Figure 3:
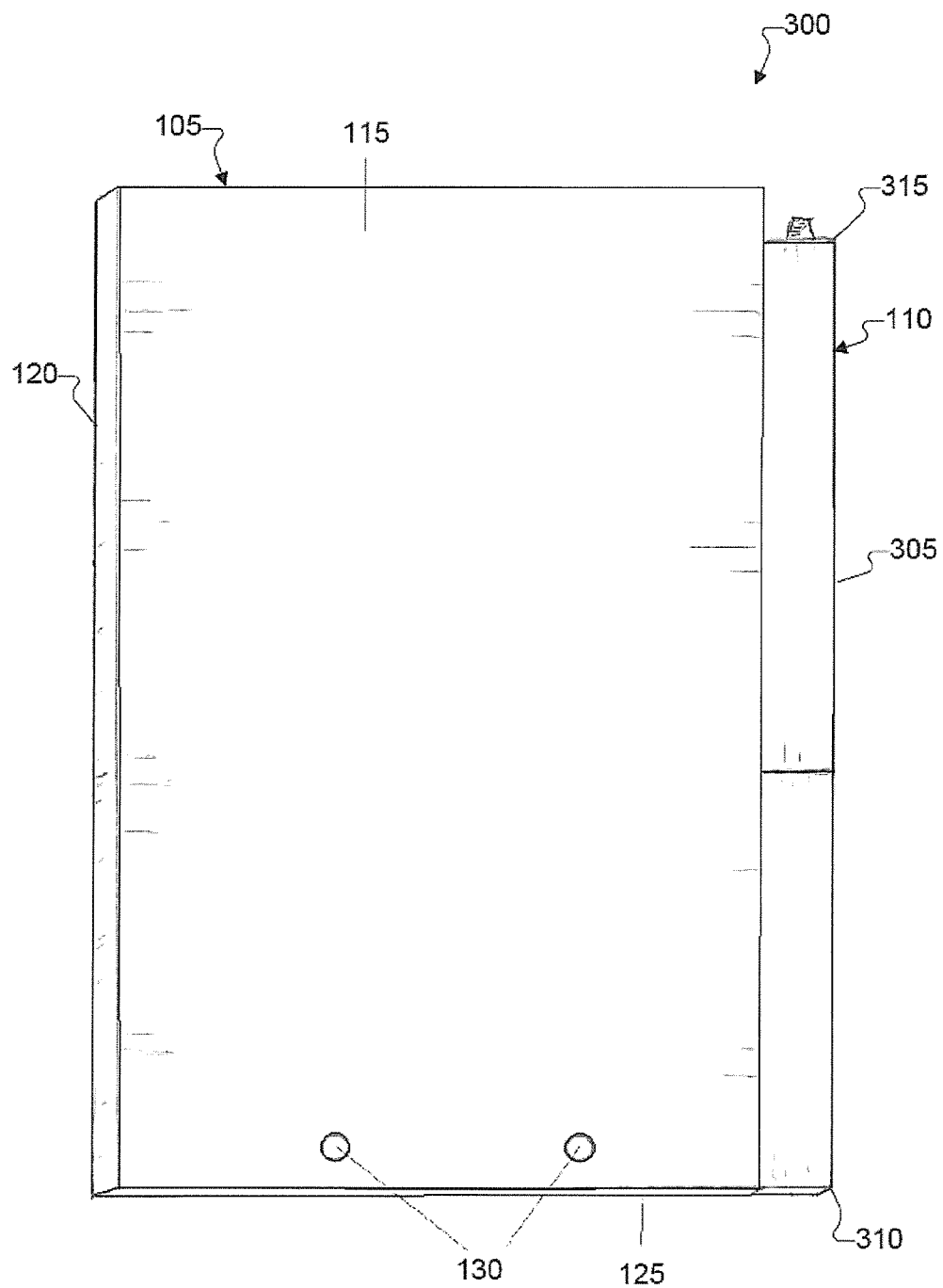
FIG. 3 illustrates a storage configuration for a portable workstation according to various embodiments of the present disclosure.

FIG. 3 illustrates a storage configuration for a portable workstation 300 according to various embodiments of the present disclosure. The embodiment of the portable workstation 300 is for illustration only. Other embodiments could be used without departing form the scope of the present disclosure.

The support rod 110 is adapted to detachably couple to a number of different mounting locations disposed on multiple faces of the planar surface 105. The support rod 110 includes a profile such that when the support rod 110 is coupled to the side face 125 of the planar surface 105, such as by connecting the third connection joints 150 to corresponding second connection joints 145, the profile of support rod 110 remains within a profile of the side face 125 of the planar surface 105. In the examples shown in FIGS. 1A through 3, the support rod 110 is illustrated as a square bar, however, the support rod 110 can be any suitable shape. In certain embodiments, one or more edges of the front face 115 include a bevel, chamfer, rounded recess, or other transition. In certain embodiments, when one of the edges between the front face 115 and the top face 135, side face 125 and bottom face 130 include a transition, at least one edge at of the support rod 110 forms an flat outer edge 305 of the workstation 300 when the support rod 110 is coupled to or inserted in the transition edge. In certain embodiments, when one or more of the edges between the front face 115 and the top face 135, side face 125 and bottom face 130 include a transition, one or more surfaces of the support rod 110 forms a bottom corner 310, outer edge 305 and top corner 315, which can include a similar transition or different transition.

The following definitions apply to certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. To the extent definitions for certain words and phrases are provided throughout this patent document, those of ordinary skill in the art should understand that in many, if not most, instances, such definitions apply to prior as well as future uses of such defined words and phrases.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable, monopod workstation comprising:
a planar surface configured to provide a portable support surface and adapted to fit in a hand of a person, the planar surface comprising:
a front face comprising one or more first type mounting joints and configured to:
support a tablet or notepad, and
detachably couple to an unstable support rod,
a back face comprising one or more second type mounting joints and configured to detachably couple to the unstable support rod, and
one or more side faces comprising one or more of the first type mounting joints and configured to detachably couple to the unstable support rod; and
the unstable support rod comprising one or more of the first type mounting joints and one or more of the second type mounting joints and configured to, when coupled via the one or more of the second type mounting joints, elevate the planar surface, and
wherein the unstable support rod comprises a first member detachably coupled to a second member, the first member is configured to:
detachably couple to different mounting locations on respective ones of a number of faces of the planar surface;
orient the planar surface when coupled to the back side of the planar surface; and
restrain articles from sliding off the front face of the planar surface when coupled to the front surface, and
wherein the second member is configured to:
detachably couple to different mounting locations on respective ones of a number of faces of the planar surface;
orient the planar surface when detachably coupled to the back side of the planar surface; and
restrain articles from sliding off the front face of the planar surface when coupled to the front surface.

2. The workstation of claim 1, where the unstable support rod comprises a thickness equal to or less than a thickness of the planar surface and a length equal to a length of the front face of the planar surface.

3. The workstation of claim 1, wherein, when coupled to a first side face of the planar surface, the unstable support rod further comprises a profile less than or equal to a profile of the first side face of the planar surface.

4. The workstation of claim 1, further comprising wherein a length of the first member is different than a length of the second member.

5. The workstation of claim 1, wherein the first member comprises a second type connector at one longitudinal end adapted to couple at least one of a longitudinal end of the second member or one of the one or more of the second type mounting joints on the back face of the planar surface.

6. The workstation of claim 1, wherein the planar surface further comprises a power source.

7. The workstation of claim 6, wherein power source is adapted to provide power to an external electronic device.

8. The workstation of claim 1, further comprising wherein a length of the first member is less than a width of the planar surface.

9. The workstation of claim 1, wherein the unstable support rod is adapted to laterally couple to at least one of the side faces of the planar surface for storage.

10. The workstation of claim 1, wherein the one or more of the first type mounting joints are flush with a surface of the planar surface.

11. The workstation of claim 1, wherein the one or more of the second type mounting joints comprise at least one of: a male mounting joint or a female mounting joint.

12. The workstation of claim 1, wherein the one or more of the first type mounting joints comprises one or more of magnets, hook and loop fastener, snaps, screws, a latches, locks, pins, interlocks, or dowels.

13. The workstation of claim 12, wherein the magnets are neodymium magnets.

14. The workstation of claim 1, wherein the planar surface is dimensioned to match a size of a notepad.

15. A portable, monopod, tablet support apparatus comprising:
   a planar surface configured to provide a portable support surface and adapted to fit in a hand of a person, the planar surface comprising:
   a front face comprising one or more first type mounting joints and configured to:
      support a tablet or notepad, and
      detachably couple to an unstable support rod,
   a back face comprising one or more second type mounting joints and configured to detachably couple to the unstable support rod, and
   one or more side faces comprising one or more of the first type mounting joints and configured to detachably couple to the unstable support rod;
   a battery in the planar surface; and
   the unstable support rod comprising one or more of the first type mounting joints and one or more of the second type mounting joints and configured to, when coupled via the one or more of the second type mounting joints,
   elevate the planar surface, and
   wherein the unstable support rod comprises a first member detachably coupled to a second member, the first member is configured to:
      detachably couple to different mounting locations on respective ones of a number of faces of the planar surface;
      orient the planar surface when coupled to the back side of the planar surface; and
      restrain articles from sliding off the front face of the planar surface when coupled to the front surface, and
   wherein the second member is configured to:
      detachably couple to different mounting locations on respective ones of a number of faces of the planar surface;
      orient the planar surface when detachably coupled to the back side of the planar surface; and
      restrain articles from sliding off the front face of the planar surface when coupled to the front surface.

16. The tablet support apparatus of claim 15, where the unstable support rod comprises a thickness equal to or less than a thickness of the planar surface and a length equal to a length of the front face of the planar surface.

17. The tablet support apparatus of claim 15, wherein, when coupled to a first side face of the planar surface, the unstable support rod further comprises a profile less than or equal to a profile of the first side face of the planar surface.

18. The tablet support apparatus of claim 15, further comprising wherein a length of the first member is different than a length of the second member.

19. The tablet support apparatus of claim 15, wherein the first member comprises a second type connector at one longitudinal end adapted to couple at least one of a longitudinal end of the second member or one of the one or more of the second type mounting joints on the back face of the planar surface.

20. The tablet support apparatus of claim 15, wherein the battery is adapted to provide power to an external electronic device.

* * * * *